United States Patent [19]

Mielke

[11] Patent Number: 4,803,501

[45] Date of Patent: Feb. 7, 1989

[54] DEVICE FOR GENERATING FLUID DROPS

[75] Inventor: Klaus Mielke, Mölnlycke, Sweden

[73] Assignee: Swedot System AB, Göteborg, Sweden

[21] Appl. No.: 13,830

[22] PCT Filed: May 13, 1986

[86] PCT No.: PCT/EP86/00281

§ 371 Date: Feb. 9, 1987

§ 102(e) Date: Feb. 9, 1987

[87] PCT Pub. No.: WO86/06684

PCT Pub. Date: Nov. 20, 1986

[30] Foreign Application Priority Data

May 13, 1985 [SE] Sweden ........................... 8502374-5

[51] Int. Cl.[4] ........................................ G01D 15/16

[52] U.S. Cl. ........................................ 346/140 R

[58] Field of Search .................... 346/140 R, 140 PD

[56] References Cited

U.S. PATENT DOCUMENTS

| | | | |
|---|---|---|---|
| 3,211,088 | 10/1965 | Naiman | 346/140 R |
| 3,452,360 | 6/1969 | Williamson | 346/140 R |
| 3,924,974 | 12/1975 | Fischbeck | 346/75 |
| 4,072,959 | 2/1978 | Elmqvist | 346/140 PV |
| 4,364,068 | 12/1982 | Lewis | 346/140 |
| 4,439,780 | 3/1984 | DeYonng et al. | 346/140 R |

FOREIGN PATENT DOCUMENTS

| | | |
|---|---|---|
| 83877 | 7/1983 | European Pat. Off. . |
| 185384 | 6/1986 | European Pat. Off. . |
| 57-110619 | 2/1982 | Japan . |

OTHER PUBLICATIONS

Snyder, "Magnetostrictive Drop Generator", IBM Technical Disclosure Bulletin, vol. 18, No. 11, Apr. 1976, pp. 3606.

*Primary Examiner*—E. A. Goldberg
*Assistant Examiner*—Mark Reinhart
*Attorney, Agent, or Firm*—Flynn, Thiel, Boutell & Tanis

[57] ABSTRACT

A device for generating fluid drops, preferably in a demand controlled ink jet printer which has a rod (3) of magneto-strictive material surrounded by a magnetization coil (4). One end (3*a*) of the rod is fixedly secured to a stationary portion (1*a*) of the device. The second, free end (3*b*) extends via a fluid-sealing leadthrough (5) into a fluid chamber (6) in the device to a position in the vicinity area of the outlet opening (8) of said fluid chamber. When actuating the magnetization coil by feeding an actuation current thereto, the magneto-strictive rod generates an ultrasonic pressure wave in the fluid at the outlet opening of the fluid chamber (6), which in turn causes an ejection of a fluid drop from said outlet opening (8).

14 Claims, 1 Drawing Sheet

DEVICE FOR GENERATING FLUID DROPS

FIELD OF THE INVENTION

The present invention relates to a device for generating fluid drops.

BACKGROUND OF THE INVENTION

The Japanese patent application No. 55-110619, filed on Aug. 12, 1980, already discloses a device for generating fluid drops comprising an inlet connected to a source for feeding fluid thereto, a fluid chamber, a fluid outlet opening of said chamber and an actuation member located at least partially in said chamber, wherein said actuation member has a front surface area located in the vicinity of said outlet opening and facing it, and wherein said actuation member is responsive to an electric actuation signal fed thereto for causing a fluid drop to be generated at the outlet opening. The prior art device for generating fluid drops is connected to a source supplying said fluid under high pressure to the inlet opening. The actuation member consists of a vibrator located outside the fluid chamber of the device, which vibrator is secured to a horn extending into the interior of said fluid chamber, said horn having a front surface area tightly sealing against the inner wall of said fluid chamber in the area of said outlet opening, to thereby form a closing valve preventing the pressurised fluid in the chamber from flowing through said outlet opening as long as the vibrator is in its non-actuated condition. When feeding an actuation signal to the vibrator, it retracts said horn from said opening to thereby allow the fluid to be ejected from said outlet opening. The size of the drops generated by said device not only depends on the pressure of the fluid as generated by the source for feeding fluid to the inlet of the device, but also depends on numerous factors varying from device to device within a series of manufactured devices, since the dynamic behaviour of the valve member of said prior art device formed by said horn, the vibrator and defined by the relative location of the horn within said chamber varies from device to device. In order to avoid any irregularities in the generation of the drops, it thus turns out to be necessary to tune said prior art device so as to obtain similar drop generation properties of all devices originating from one manufacturing series.

The European patent application No. 82 307 017.2, publication No. 83877, filed on Dec. 31, 1982, discloses another kind of device for generating fluid drops which does not make use of a valve member closing and opening periodically the outlet opening of the device. This prior art device for generating fluid drops has its inlet continuously connected to a fluid chamber, which in turn is continuously connected to the outlet opening. A wall portion of the fluid chamber is made of a mechanically preloaded, deformed diaphragm which can be actuated by the transducer device. When feeding an actuation current to the transducer, said diaphragm is bent away from its preloaded position to thereby introduce a pressure wave in the fluid causing an ejection of a fluid droplet from the outlet opening. The size of the drop formed by actuating said transducer depends on numerous factors, like the degree of preloading said diaphragm, variations in the geometric dimensions of the transducer device, varying interengagement conditions between the transducer and diaphragm, and so on. Thus it is necessary to tune this prior art device to achieve uniform drop generating properties of all devices manufactured by making use of series production.

The prior, non-prepublished international application PCT/EP85/00724 and the corresponding prior, non-prepublished European application No. 85 116 306.3 (applicant's own) concerns a further device for generating fluid drops making use of a movable actuation member cooperating with an elastic, diaphragm-like partition wall separating the inlet from the outlet of said device and forming a kind of valve seat.

In view of this state of art, the present invention is based on the object to provide a device for generating fluid drops which has stable and reliably pre-determinable drop generation properties which do not vary between the different devices orginating from one manufacturing series, so that it is no longer necessary to individually tune each single drop generating device.

This object is achieved by a device for generating fluid drops in accordance with the invention.

The claimed device avoids any dependency of the size of the fluid drops on the properties of the source for feeding fluid to the inlet due to the fact that it works with a fluid supply under atmospheric pressure. The actuation member of the device in accordance with the present invention does not act as a valve for closing and opening the outlet opening, but has rather to be considered as a transmitter for ultrasonic waves which cause fluid drops to be ejected from said outlet opening. The actuation member is an integral member consisting of magneto-strictive material and is not a compound element having numerous elements which were required for forming the actuation members of prior art devices and which cause great variations in the actuation properties. The actuation member of the device in accordance with the present invention is integrally formed of magneto-strictive material. It has turned out that this very simple mechanical structure has a dynamic behaviour which can be reliably predetermined and which does not change from one device to the next within one manufacturing series. These constant and predictable properties are first of all achieved by the fact that the actuation member of the device in accordance with the present invention does not interfere with other devices, like diaphragms or means for preloading the actuation member. Moreover, the pressure wave generated by the actuation member is essentially independent of the exact distance between the front surface area of the rod-like integral member and the inner wall of the chamber surrounding the outlet opening which further enhances the accuracy in generating fluid drops.

Hence, the fluid drop generating device in accordance with the present invention replaces complicated mechanical structures which have been used and suggested until now by a simple device which does not require any tuning for achieving the desired drop generation properties.

Moreover, the device in accordance with the present invention meets high requirements for long-term stability and works with actuation signals at common drive voltages in the range of 5 to 25 volts.

BRIEF DESCRIPTION OF THE DRAWINGS

A preferred embodiment of the present invention is described hereinafter with reference to the enclosed drawings, wherein.

DETAILED DESCRIPTION

Figure 1:
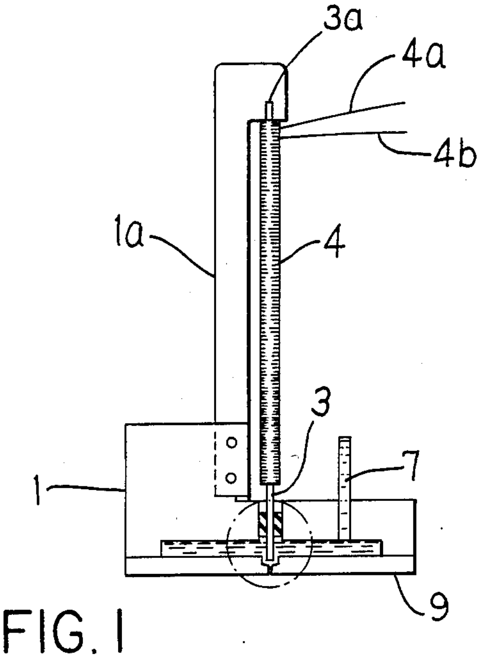
FIG. 1 shows a side view of a drop generating device.
Figure 2:
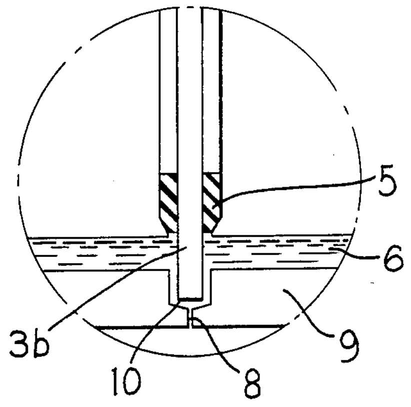
FIG. 2 shows a portion encircled in FIG. 1 in an enlarged manner.

The device for generating fluid drops has a stationary housing or support portion 1 comprising an essentially yoke-formed portion 1*a* for attaching one end 3*a* of a rod 3 of magneto-strictive material to the support portion 1. The magneto-strictive material can be a cobalt-iron alloy. The magneto-strictive rod is surrounded by a magnetisation coil 4 with connections 4*a*, 4*b* for a current supply to the coil 4 from an electrical control circuit, which circuit is known per se in the art, and is thus not to be further described herein. The other end of said rod 3 is a free end 3*b*. This free end 3*b* expands to a fluid sealing wall lead-through 5 made of elastic material, e.g. a material which is commercially available under the trade name "ELASTON", in other words, the major portion of said rod 3 is located outside said fluid chamber 6. Only the free end defining a front or end surface area of said rod extends through the fluid-sealing arrangement 5 into the chamber 6.

An inlet 7 to the chamber 6 is supplied with fluid being under atmospheric pressure. The fluid chamber 6 has an outlet opening 8 to the ambient air, which outlet opening is provided with a nozzle plate 9. A recess in the nozzle plate 9 forms a space 10 in the fluid chamber 6 where the free end of the magneto-strictive rod 3 is positioned in the intermediate vicinity of the outlet opening 8.

Preferably, the front surface area of the free end 3*b* of the rod 3 is located in spaced-apart relationship with respect to the inner wall of the fluid chamber 6 surrounding the outlet opening 8. However, it is also possible to arrange the rod such that its front surface area contacts the inner wall of the chamber for closing the outlet opening 8.

The electrical control circuit (not shown here) supplies a current via the connections 4*a*, 4*b* to the magnetisation coil 4, so as to generate an impact wave or shock wave of ultrasonic frequency in the fluid at the outlet opening 8 in the fluid chamber 6 causing an expulsion or ejection of a fluid droplet from the outlet opening in the nozzle plate 9.

There is a minimum of flow losses during the operation of generating drops since the energy supply to the fluid takes place in direct connection with the passing-out of the fluid to the ambient air. This leads to the advantage that the device has a broad range of operating frequencies from 1 Hz to 10 KHz.

The yoke-formed portion 1*a* of the preferred device can also be made of magneto-strictive material with opposite signs concerning the length variation when compared to the sign of length variation of the material forming the rod 3. If rod 3 is made of cobalt-iron alloy having a positive magneto-strictive coefficient causing an increase of the length under the influence of a magnetic field generated by the coil 4, said magnetic field also acting on portion 1*a* forming a close magnetic circuit with the rod 3 causes a decrease in length of the yoke-formed portion 1*a*, if the material thereof has a magneto-strictive coefficient, e.g. when using pure nickel for this purpose.

The opposite relationship can also be achieved when forming the rod 3 of a material having a negative magneto-strictive coefficient, like nickel, whilst choosing a material of positive magneto-strictive coefficient for forming the portion 1*a*, e.g. cobalt-iron. Through this choice of material for the rod 3 and the portion 1*a*, a positive co-action of the length variation caused in the rod or in said portion, can be obtained.

Another possible modification consists in that the magnetisation coil 4 does not surround said magneto-strictive rod 3, but is located on the magneto-strictive portion 1*a* instead thereof.

The embodiments of the invention in which an exclusive property or privilege is claimed are defined as follows:

1. A device for generating ink drops, comprising: a housing having walls defining an ink chamber, having an ink supply terminating in said ink chamber, having an ink outlet opening in one of said walls defining said ink chamber, and having in another of said walls an aperture; an elastic sealing element provided in said aperture; a rod-shaped actuation member having a first end portion with an end surface, having a second end portion, and having an intermediate portion extending between said end portions, said actuation member having a longitudinal axis which is aligned with said ink outlet opening, said actuation member being made of a magnetostrictive material; and a magnetizing coil, said actuation member varying dimensionally in response to a magnetic field applied thereto by said magnetizing coil; wherein said actuation member extends through said sealing element and said aperture so that its first end portion extends into said ink chamber while its second end portion lies outside said ink chamber, said actuation member being supported by support means on said housing at a location spaced from said first end portion while having said end surface on its first end portion facing toward the vicinity of said ink outlet opening; wherein said intermediate portion and said second end portion of said actuating member are disposed outside said ink chamber; wherein said actuation member is supported by said support means at said second end portion so that solely said first end portion extends into said ink chamber; wherein said housing includes a support portion and said support means includes a yoke-shaped portion supporting said second end portion of said actuation member; and wherein said yoke-shaped portion is made of a magnetostrictive material which responds to the influence of the magnetic fields produced by said magnetizing coil oppositely to said magnetostrictive actuation member, by respectively expanding and contracting dimensionally in directions parallel to said longitudinal axis of said actuation member as said actuation member respectively contracts and expands dimensionally parallel to said longitudinal axis.

2. A device according to claim 1, wherein one of said actuation member and said yoke-shaped portion is made of a cobalt-iron alloy, and said other thereof is made of pure nickel.

3. A device according to claim 2, wherein said magnetizing coil surrounds at least part of said intermediate portion of said actuating member.

4. A device according to claim 2, wherein said magnetizing coil surrounds part of said yoke-shaped portion.

5. A device for generating ink drops, comprising: a housing having walls defining an ink chamber, having an ink supply terminating in said ink chamber, having an ink outlet opening in one of said walls defining said ink chamber, and having in another of said walls an aperture; an elastic sealing element provided in said aperture; a rod-shaped actuation member having a first end portion with an end surface, having a second end portion, and having an intermediate portion extending between said end portions, said actuation member having a longitudinal axis which is aligned with said ink outlet opening, said actuation member being made of a magnetostrictive material; and a magnetizing coil, said actuation member varying dimensionally in response to a magnetic field applied thereto by said magnetizing coil; wherein said actuation member extends through said sealing element and said aperture so that its first end portion extends into said ink chamber while its second end portion lies outside said ink chamber, said actuation member being supported by support means on said housing at a location spaced from said first end portion while having said end surface on its first end portion facing toward the vicinity of said ink outlet opening; wherein said intermediate portion and said second end portion of said actuating member are disposed outside said ink chamber, wherein said actuation member is supported by said support means at said second end portion so that solely said first end portion extends into said ink chamber; and wherein said housing includes a nozzle plate which is said one wall having therein said ink outlet opening, said nozzle plate having therein a recess which leads to said ink outlet opening and which has a width greater than the transverse thickness of said actuation member, said first end portion of said actuation member extending into said recess so that said end surface is disposed in the immediate vicinity of said ink outlet opening.

6. A device according to claim 5, wherein said housing includes a support portion and said support means includes a yoke-shaped portion supporting said second end portion of said actuation member.

7. A device for generating fluid drops, comprising:

a housing having therein a fluid chamber, having means for supplying a fluid to said chamber, having an outlet passage which at one end opens into said fluid chamber and at the other end opens through an exterior surface of said housing, and having an aperture which opens into said fluid chamber on a side thereof opposite from said outlet passage;

an elongate member made of a magnetostrictive material and having first and second end portions at opposite ends thereof, said first end portion being disposed in said fluid chamber and having thereon an end surface which faces said one end of said outlet passage, and said elongate member extending into said aperture from said fluid chamber, said second end portion of said elongate member being spaced from said fluid chamber, said first end portion having a dimension in a direction lengthwise of said elongate member which is substantially less than the length in said direction of the rest of said elongate member;

means in said aperture and cooperable with said elongate member immediately adjacent said first end portion for preventing fluid in said chamber from leaking therefrom through said aperture and from contacting portions of said elongate member other than said first end portion, and for permitting limited reciprocal movement of said elongate member within said aperture parallel to said direction;

means provided on said housing and cooperable with said second end portion of said elongate member for resisting movement of said second end portion away from said aperture parallel to said direction; and means for applying to said elongate member a varying magnetic field;

wherein said housing has first and second surfaces defining opposite sides of said fluid chamber, said first surface having therein a recess, said aperture being provided in said second surface and said outlet passage extending from an inner end of said recess to said exterior surface of said housing, and wherein said recess has a cross-sectional size which is greater than the cross-sectional size of said first end portion of said elongate member, said first end portion of said elongate member extending from a location adjacent said second surface to a location within said recess.

8. A device according to claim 7, wherein said elongate member is made of a cobalt-iron alloy.

9. A device according to claim 7, wherein said outlet passage extends substantially rectilinearly from said fluid chamber to said exterior surface of said housing substantially parallel to said direction lengthwise of said elongate member.

10. A device according to claim 7, wherein said means for supplying a fluid introduces the fluid to said chamber at atmospheric pressure.

11. A device according to claim 7, wherein said means cooperable with said second end portion of said elongate member is a yoke member which is fixedly supported on said housing and fixedly secures said second end portion of said elongate member against movement away from said aperture in said direction.

12. A device for generating fluid drops, comprising:

a housing having therein a fluid chamber, having means for supplying a fluid to said chamber, having an outlet passage which at one end opens into said fluid chamber and at the other end opens through an exterior surface of said housing, and having an aperture which opens into said fluid chamber on a side thereof opposite from said outlet passage;

an elongate member made of a magnetostrictive material and having first and second end portions at opposite ends thereof, said first end portion being disposed in said fluid chamber and having thereon an end surface which faces said one end of said outlet passage, and said elongate member extending into said aperture from said fluid chamber, said second end portion of said elongate member being spaced from said fluid chamber, said first end portion having a dimension in a direction lengthwise of said elongate member which is substantially less than the length in said direction of the rest of said elongate member;

means in said aperture and cooperable with said elongate member immediately adjacent said first end portion for preventing fluid in said chamber from leaking therefrom through said aperture and from contacting portions of said elongate member other than said first end portion, and for permitting limited reciprocal movement of said elongate member within said aperture parallel to said direction;

means provided on said housing and cooperable with said second end portion of said elongate member for resisting movement of said second end portion away from said aperture parallel to said direction; and means for applying to said elongate member a varying magnetic field;

wherein said means cooperable with said second end portion of said elongate member includes an elongate yoke member which extends approximately parallel to said direction, which has a first end supported on said housing, which has a second end operatively coupled to said second end portion of said elongate member, and which is made of a magnetostrictive material having a coefficient of expansion opposite to that of said magnetostrictive elongate member so that in response to said varying magnetic field said yoke member respectively expands and contracts dimensionally in said direction as said elongate member respectively contracts and expands dimensionally in said direction.

13. A device according to claim 12, wherein said means for applying said magnetic field includes a coil encircling a portion of said elongate member.

14. A device according to claim 12, wherein said means for applying said magnetic field includes a coil provided around a portion of said yoke member.

* * * * *